US012659308B2

(12) United States Patent
Crowley et al.

(10) Patent No.: US 12,659,308 B2
(45) Date of Patent: **\*Jun. 16, 2026**

(54) BI-DIRECTIONAL ENTERPRISE SOFTWARE INTEGRATION WITH COLLABORATION TOOLS

(71) Applicant: HARTFORD FIRE INSURANCE COMPANY, Hartford, CT (US)

(72) Inventors: Daniel Wayne Crowley, Crestwood, MO (US); David M. Senak, Avon, CT (US); Eva Angela Magee, St. Louis, MO (US); Jeremy Walter, Chandler, AZ (US); Jocelyn Amy DeMaio, Glastonbury, CT (US); John Gerard Buccetti, Wallingford, CT (US); Julie Ann Reed, Coventry, CT (US); Rajesh Kamlakar Nerurkar, Charlotte, NC (US); Richard W. Schaefer, New Britain, CT (US); Sona O. Sliker, Charleston, SC (US); Wayne W. Church, Clinton, CT (US)

(73) Assignee: HARTFORD FIRE INSURANCE COMPANY, Hartford, CT (US)

( \* ) Notice: Subject to any disclaimer, the term of this patent is extended or adjusted under 35 U.S.C. 154(b) by 59 days.

This patent is subject to a terminal disclaimer.

(21) Appl. No.: 18/958,847

(22) Filed: Nov. 25, 2024

(65) Prior Publication Data

US 2025/0088496 A1 Mar. 13, 2025

Related U.S. Application Data

(63) Continuation of application No. 18/607,701, filed on Mar. 18, 2024, now Pat. No. 12,184,633, which is a (Continued)

(51) Int. Cl.
*G06Q 10/101* (2023.01)
*H04L 9/40* (2022.01)

(52) U.S. Cl.
CPC ....... *H04L 63/0807* (2013.01); *G06Q 10/101* (2013.01); *H04L 63/0815* (2013.01)

(58) Field of Classification Search
CPC ............. H04L 63/0807; H04L 63/0815; H04L 63/102; H04L 63/104; G06Q 10/101; G06Q 10/103
See application file for complete search history.

(56) References Cited

U.S. PATENT DOCUMENTS 10,901,728 B1 \* 1/2021 Negoshian ................ G06F 8/61
2017/0192754 A1 \* 7/2017 Bohn ........................ G06F 8/30
(Continued)

*Primary Examiner* — Chris Parry
*Assistant Examiner* — Steven C Nguyen
(74) *Attorney, Agent, or Firm* — Buckley, Maschoff & Talwalkar LLC

(57) ABSTRACT

An enterprise platform may retrieve, from a collaboration data store, information about a selected enterprise team. The enterprise platform may then transmit, from a set of integration tools to a workflow tool of a remote cloud-based environment, a data payload including a notification request associated with a channel. The enterprise platform may also transmit, from a runtime environment to a business communication platform of the cloud-based environment, a request to post a notification to the channel and arrange for a member of the selected enterprise team to receive an adaptive information card, pushed by the business communication platform via the channel, containing information associated with at least one of the integration tools. The member who receives the adaptive information card may also, via selection of a graphical icon on the card, respond to the business communication platform via bi-directional communication.

20 Claims, 15 Drawing Sheets

Related U.S. Application Data continuation of application No. 17/501,621, filed on Oct. 14, 2021, now Pat. No. 11,968,200.

(56)                     References Cited

U.S. PATENT DOCUMENTS

2018/0364985 A1* 12/2018 Liu ........................... G06F 8/36
2020/0293310 A1*  9/2020 Mittell ..................... G06F 8/76
2021/0203653 A1*  7/2021 Kochhar ................. H04L 63/20

* cited by examiner

400

410

QA Teams Enterprise Collaboration Integration 4/7 3:01 PM

Demo David has been opened

Repo:        cto_teamdevops_botadmin
Action:      opened
Issue:       17
Title:       Demo David
Author:      co12345
State:       open
Assignee:
Test:
Label:

412     414     416

View In GitHub    Comments    Label

Comments:    Here is where comments can be inserted.

418

Submit

2 Replies from QA Teams DevOps Integration

← Reply

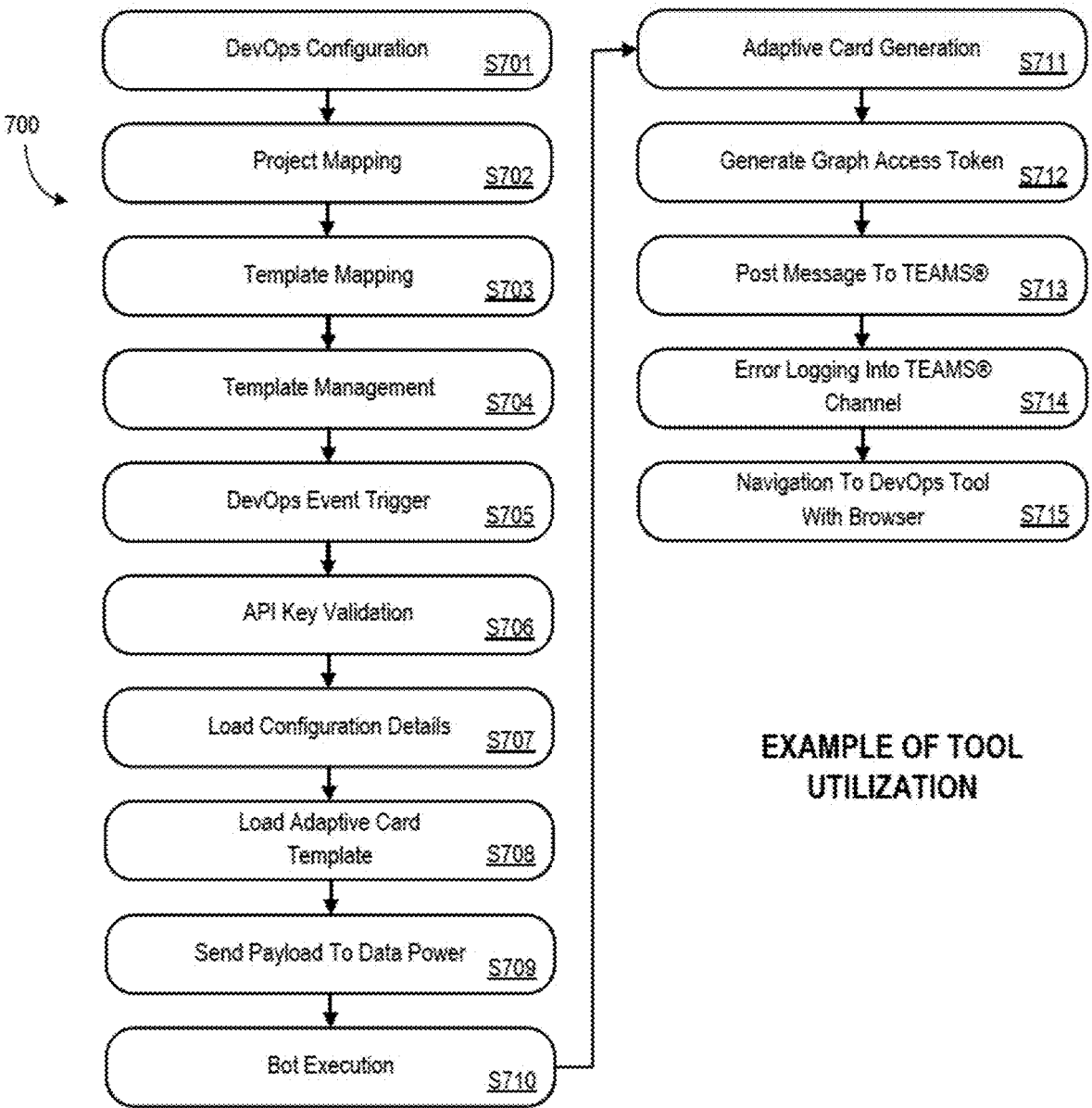

700

DevOps Configuration     S701

Project Mapping     S702

Template Mapping     S703

Template Management     S704

DevOps Event Trigger     S705

API Key Validation     S706

Load Configuration Details     S707

Load Adaptive Card Template     S708

Send Payload To Data Power     S709

Bot Execution     S710

Adaptive Card Generation     S711

Generate Graph Access Token     S712

Post Message To TEAMS®     S713

Error Logging Into TEAMS® Channel     S714

Navigation To DevOps Tool With Browser     S715

EXAMPLE OF TOOL UTILIZATION

FIG. 7

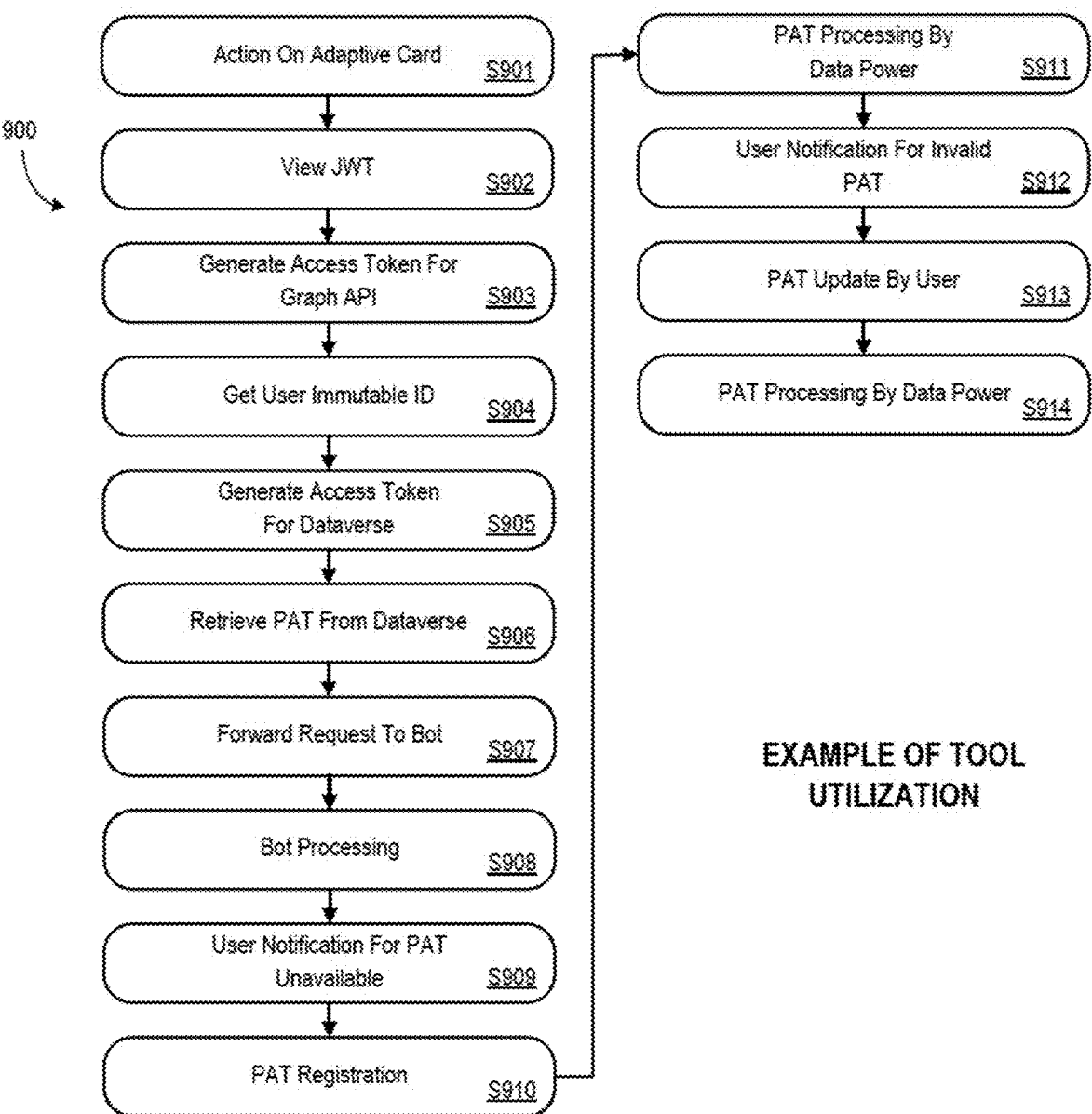

900

Action On Adaptive Card    S901

View JWT    S902

Generate Access Token For Graph API    S903

Get User Immutable ID    S904

Generate Access Token For Dataverse    S905

Retrieve PAT From Dataverse    S906

Forward Request To Bot    S907

Bot Processing    S908

User Notification For PAT Unavailable    S909

PAT Registration    S910

PAT Processing By Data Power    S911

User Notification For Invalid PAT    S912

PAT Update By User    S913

PAT Processing By Data Power    S914

EXAMPLE OF TOOL UTILIZATION

FIG. 9

| MEMBER ID 1302 | MEMBER NAME 1304 | COLLABORATION ENTERPRISE TOOL 1306 | COMMUNICATION ADDRESS 1308 | ⋮ | COLLABORATION PARAMETER 1310 |
|---|---|---|---|---|---|
| M_101 | SUSAN GREENE | | | | |
| M_102 | JOHN WEST | | | | |
| M_103 | OPS TEAM LEADER | | | | |
| M_104 | JANE SMITH | | | | |

BI-DIRECTIONAL ENTERPRISE SOFTWARE INTEGRATION WITH COLLABORATION TOOLS

CROSS-REFERENCE TO RELATED APPLICATIONS

The present application is a continuation of U.S. patent application Ser. No. 18/607,701 entitled "BI-DIRECTIONAL ENTERPRISE SOFTWARE INTEGRATION WITH COLLABORATION TOOLS" and filed on Mar. 18, 2024 which was a continuation of U.S. patent application Ser. No. 17/501,621 entitled "BI-DIRECTIONAL ENTERPRISE SOFTWARE INTEGRATION WITH COLLABORATION TOOLS" and filed on Oct. 14, 2021. The entire contents of those applications are incorporated herein by reference.

TECHNICAL FIELD

The present application generally relates to computer systems and more particularly to computer systems that are adapted to accurately and/or automatically facilitate bi-directional enterprise software integration with collaboration tools via a business communication platform.

BACKGROUND

An enterprise, such as a business, may want to facilitate collaborations within and/or between teams and team members. In some cases, an enterprise may have thousands of team members who each access many different enterprise applications. Each team member may need to log into (and out of) each of these applications multiple times per day to check the status of various software projects and/or other developments. Moreover, an enterprise team member might want to communicate or exchange information with other members of that team (or even with members of another enterprise team). Such manual, application-by-application approach can be a time-consuming and costly process in terms of employee time and computer resources—especially when a substantial number of team members and/or enterprise applications are involved.

It would be desirable to provide improved systems and methods to accurately and/or automatically facilitate bi-directional enterprise software integration with collaboration tools via a business communication platform. Moreover, the information should be easy to access, understand, update, etc.

SUMMARY OF THE INVENTION

According to some embodiments, systems, methods, apparatus, computer program code and means are provided to accurately and/or automatically facilitate bi-directional enterprise software integration with collaboration tools via a business communication platform in a way that provides fast and useful communications and that allows for flexibility and effectiveness when responding to those communications.

An enterprise platform may retrieve, from a collaboration data store, information about a selected enterprise team. The enterprise platform may then transmit, from a set of integration tools to a workflow tool of a remote cloud-based environment, a data payload including a notification request associated with a channel. The enterprise platform may also transmit, from a runtime environment to a business communication platform of the cloud-based environment, a request to post a notification to the channel and arrange for a member of at least one of the selected enterprise team to receive an adaptive information card, pushed by the business communication platform via the channel, containing information associated with at least one of the integration tools. The member who receives the adaptive information card may also, via selection of a graphical icon on the card, respond to the business communication platform via bi-directional communication.

Some embodiments comprise: means for retrieving, by a computer processor of an enterprise platform from a collaboration data store, information about a selected enterprise team, wherein the collaboration data store contains electronic records associated with a set of enterprise teams, each electronic record including an electronic record identifier and at least one team member communication address; means for transmitting, from a set of integration tools to a workflow tool of a remote cloud-based environment, a data payload including a notification request associated with a channel; means for transmitting, from a runtime environment to a business communication platform of the cloud-based environment, a request to post a notification to the channel; means for arranging for a member of the selected enterprise team to receive an adaptive information card, pushed by the business communication platform via the channel, containing information associated with at least one of the integration tools; and means for receiving, from the member who receives the adaptive information card via selection of a graphical icon on the adaptive information card, a response to the business communication platform via bi-directional communication, wherein a communication port coupled to the enterprise platform facilitates a transmission of data with remote team member devices to support a graphical team member display, including the adaptive information card, via a distributed communication network.

In some embodiments, a communication device associated with an enterprise platform exchanges information with remote devices in connection with an interactive graphical team member interface. The information may be exchanged, for example, via public and/or proprietary communication networks.

A technical effect of some embodiments of the invention is an improved and computerized way to accurately and/or automatically facilitate bi-directional enterprise software integration with collaboration tools via a business communication platform in a way that provides fast and useful communications. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 7 illustrates one-way communication use case elements for an example of tool utilization according to some embodiments.

FIG. 9 illustrates bi-directional communication use case elements according to some embodiments.

FIG. 13 is a portion of a collaboration data store according to some embodiments.

DETAILED DESCRIPTION

Figure 1:
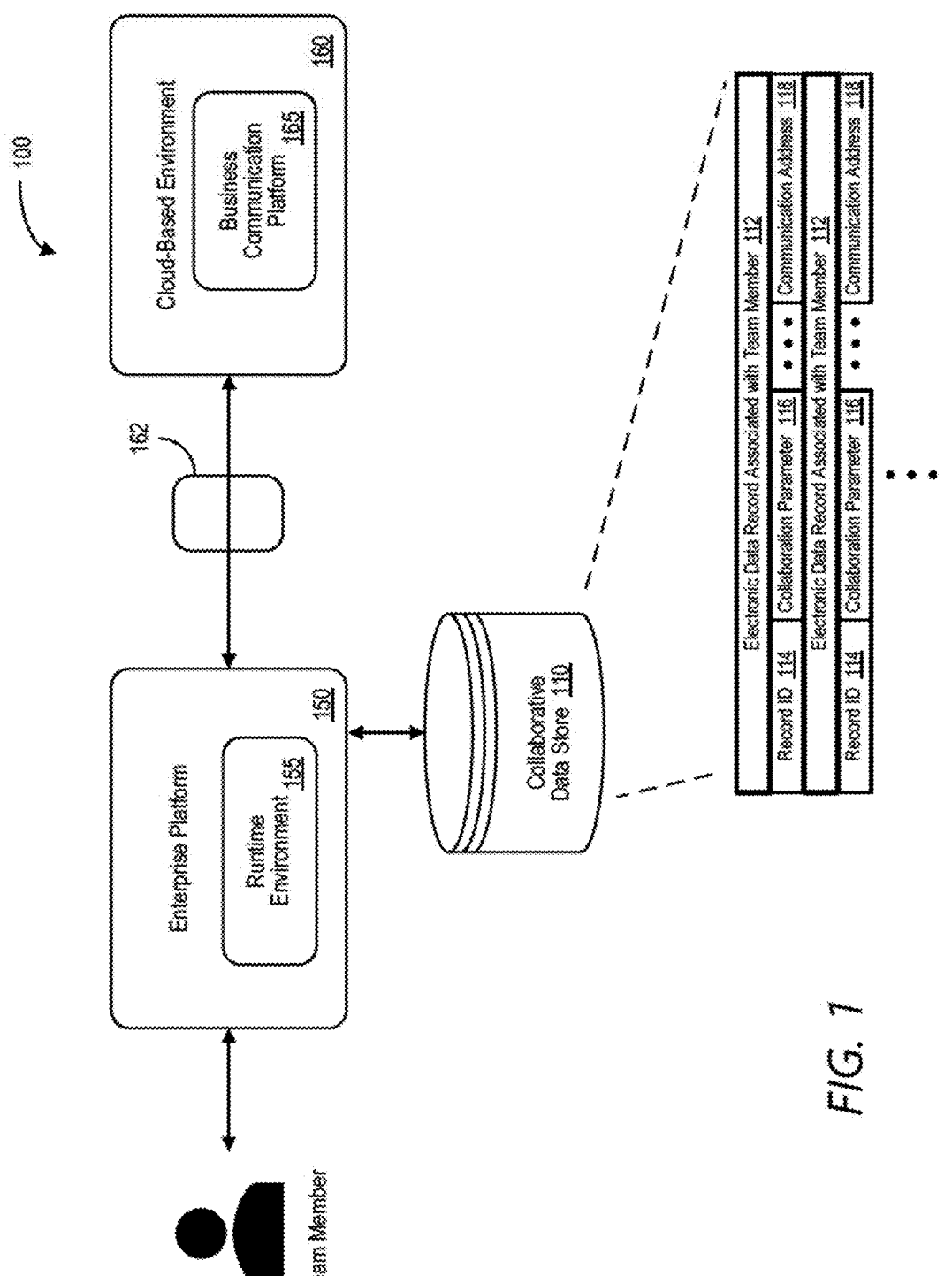
FIG. 1 is a high-level block diagram of a collaboration system in accordance with some embodiments.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data analytics associated with a collaboration system. The present invention is directed to more than merely a computer implementation of a routine or conventional activity previously known in the industry as it provides a specific advancement in the area of electronic record analysis by providing improvements in the operation of a computer system that teams can more easily and efficiently access information about enterprise collaboration integration tools (as well as other applications). The present invention provides improvement beyond a mere generic computer implementation as it involves the novel ordered combination of system elements and processes to provide improvements in the ease and speed at which such information may be performed shared. Some embodiments of the present invention are directed to a system adapted to automatically analyze electronic records, aggregate data from multiple sources, distribute status information via information channels, etc. Moreover, communication links and messages may be automatically established, aggregated, formatted, exchanged, etc. to improve network performance (e.g., by reducing an amount of network messaging bandwidth and/or storage required to support collaboration).

FIG. 1 is a high-level block diagram of a collaboration system or system 100 according to some embodiments of the present invention. In particular, the system 100 includes an enterprise platform 150 that may access information in a collaboration data store 110 (e.g., storing a set of electronic records associated with a set of enterprise teams and/or team members 112, each record including, for example, one or more record identifiers 114, collaboration parameters 116, communication addresses, etc.). The enterprise platform 150 may also store information into other data stores and utilize a runtime environment 155 to view, analyze, and/or update the electronic records. The enterprise platform 150 may also exchange information with a cloud-based environment 160 (e.g., via a firewall 162) executing a business communication platform 165. According to some embodiments, an interactive graphical user interface platform of the enterprise platform 150 (and, in some cases, enterprise data and/or third-party data) may facilitate forecasts, decisions, predictions, and/or the display of communications via one or more remote administrator computers (e.g., to identify appropriate updates to rules and logic). Note that the enterprise platform 150 and/or any of the other devices and methods described herein might be associated with a third party, such as a vendor that performs a service for an enterprise.

The enterprise platform 150 and/or the other elements of the system 100 might be, for example, associated with a Personal Computer ("PC"), laptop computer, smartphone, an enterprise server, a server farm, and/or a database or similar storage devices. According to some embodiments, an "automated" enterprise platform 150 (and/or other elements of the system 100) may facilitate automated collaboration between teams and team members. As used herein, the term "automated" may refer to, for example, actions that can be performed with little (or no) intervention by a human.

As used herein, devices, including those associated with the enterprise platform 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The enterprise platform 150 may store information into and/or retrieve information from the collaboration data store 110. The collaboration data store 110 might be locally stored or reside remote from the enterprise platform 150. As will be described further below, the collaboration data store 110 may be used by the enterprise platform 150 in connection with an interactive user interface to access and update electronic records. Although a single enterprise platform 150 is shown in FIG. 1, any number of such devices may be included. Moreover, various devices described herein might be combined according to embodiments of the present invention. For example, in some embodiments, the enterprise platform 150 and collaboration data store 110 might be co-located and/or may comprise a single apparatus.

Figure 2:
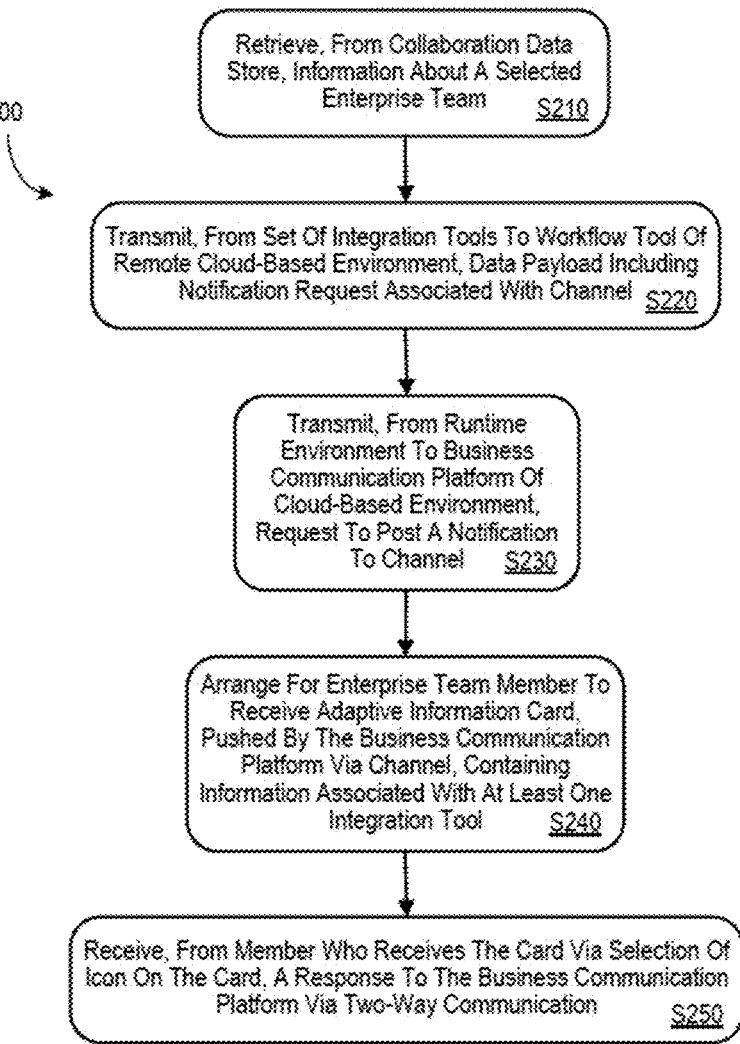
FIG. 2 illustrates a collaboration method according to some embodiments of the present invention.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a computer processor of an enterprise platform may receive, from a collaboration data store, information about a selected enterprise team. The collaboration data store may, for example, contain electronic records associated with a set of enterprise teams, with each electronic record including an electronic record identifier and at least one team member communication address (e.g., any information that might be used to communicate directly with, route, or exchange information in any way with teams or team members). about the selected enterprise team might be associated with a software development enterprise team and/or an IT operations enterprise team (e.g., a DevOps team). Although some embodiments described herein use DevOps teams as an example, note that embodiments may be associated with other enterprise group collaborations and tools.

At S220, the system may transmit, from a set of enterprise collaboration integration tools to a workflow tool of a remote cloud-based environment, a data payload including a notification request associated with a channel. As used herein, the phrase enterprise collaboration integration tools might refer to, for example, GitHub®, Jenkins®, UDeploy®, ServiceNow®, Automated Test Framework ("ATF"), Bianca®, Callisto®, Plutora®, CYPRESS®, DIONE®, etc. Moreover, a workflow tool might comprise MICROSOFT FLOW® workflow tool. At S230, the system may transmit, from a runtime environment to a business communication platform of the cloud-based environment, a request to post a notification to the channel. As used herein, the phrase "runtime environment" might refer to, for example, a Node.JS bot runtime environment and a business communication platform might refer to the TEAMS® communication platform available from MICROSOFT®.

Figure 3:
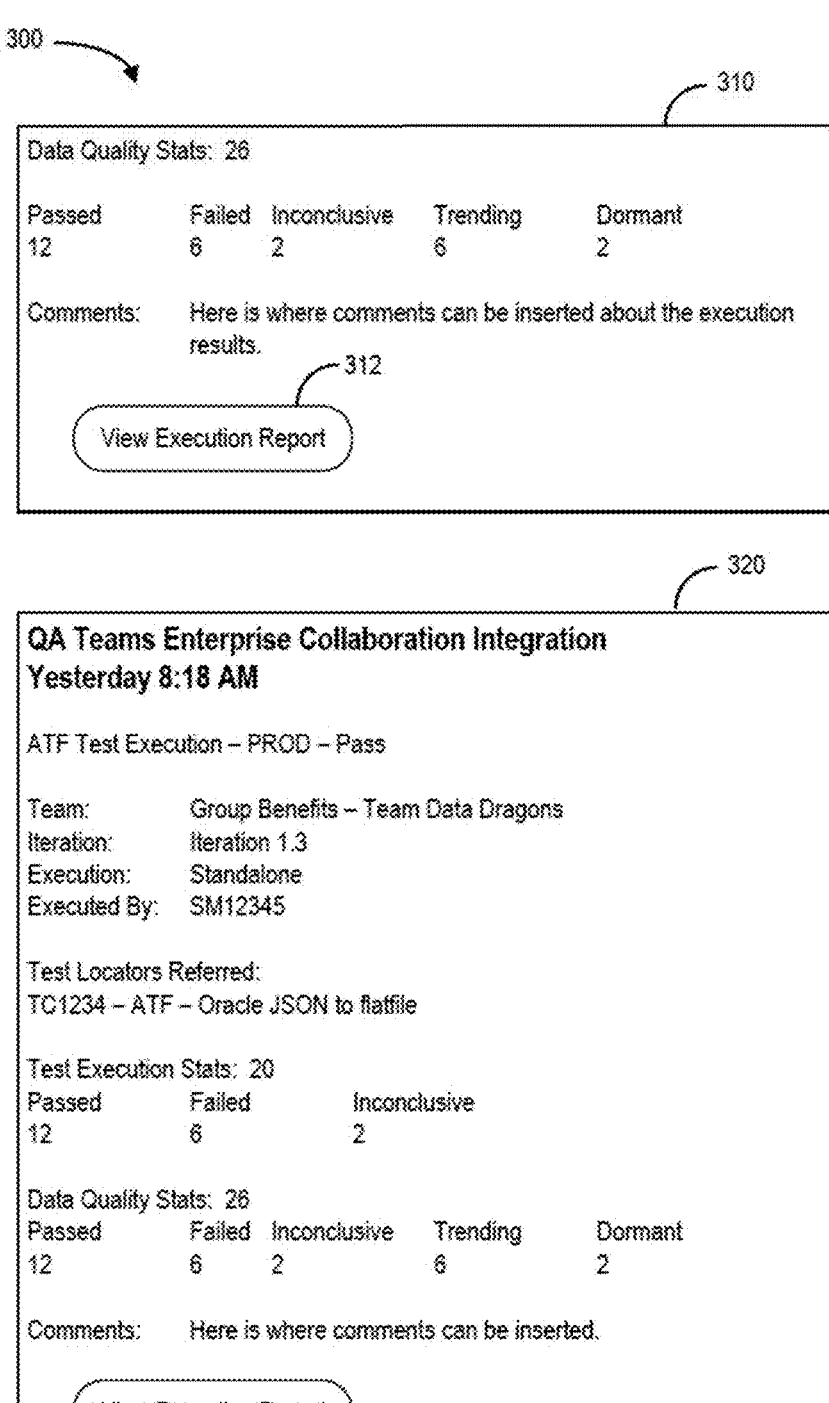
FIGS. 3 and 4 illustrate adaptive information cards in accordance with some embodiments.
Figure 4:
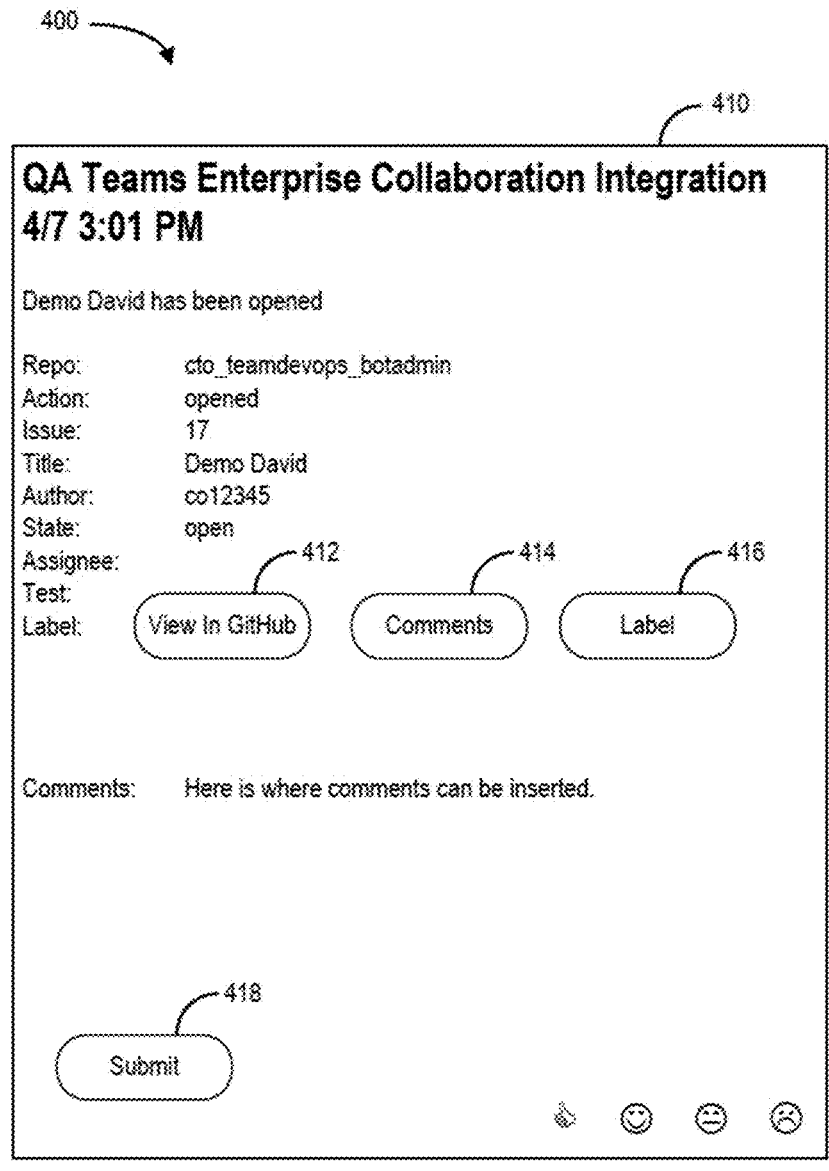

At S240, the system may arrange for a member of the selected enterprise team to receive an adaptive information card, pushed by the business communication platform via the channel, containing information associated with at least one of the enterprise collaboration integration tools. At S250, the system may receive, from the member who receives the adaptive information card via selection of a graphical icon on the adaptive information card, a response to the business communication platform via bi-directional communication (e.g., and the bi-directional communication may send information one of the set of enterprise collaboration integration tools). As used herein, the term "bi-directional" may refer to, for example, a two-way exchange of information between enterprise software (e.g., a software tool) and an enterprise team member via a business communication platform. For example, FIGS. 3 and 4 illustrate adaptive information cards in accordance with some embodiments. An adaptive information card may post notifications of various enterprise collaboration integration tool events on a mapped TEAMS® channel (containing information about the event and, in some cases, providing an ability to interact with enterprise collaboration integration tools, such as DevOps integration tools). The examples 300 of FIG. 3 include a first information card 310 that displays various data quality statistics (e.g., passed, failed, inconclusive, trending, dormant, etc.) along with comments. In addition to providing information to team members ("one-way" communication), the information card 310 may include a user-selectable icon 312 that can be used to receive information from team members ("bi-directional" communication). The examples 300 further include a second information card 320 illustrating additional types of information that may be shared in connection with a collaboration tool (e.g., team name, iteration, execution, test execution statistics, a team, an iteration, an action, an issue, an author, etc.). The example 400 of FIG. 4 shows still another information card 410 that might be provided to a team member. The information card 410 includes a date and time along with an indication that a demo has been opened. The card 410 has options to open GitHub 412, provide comments 414, and enter a label 416 that can be submitted 418 to the system.

Figure 10A:
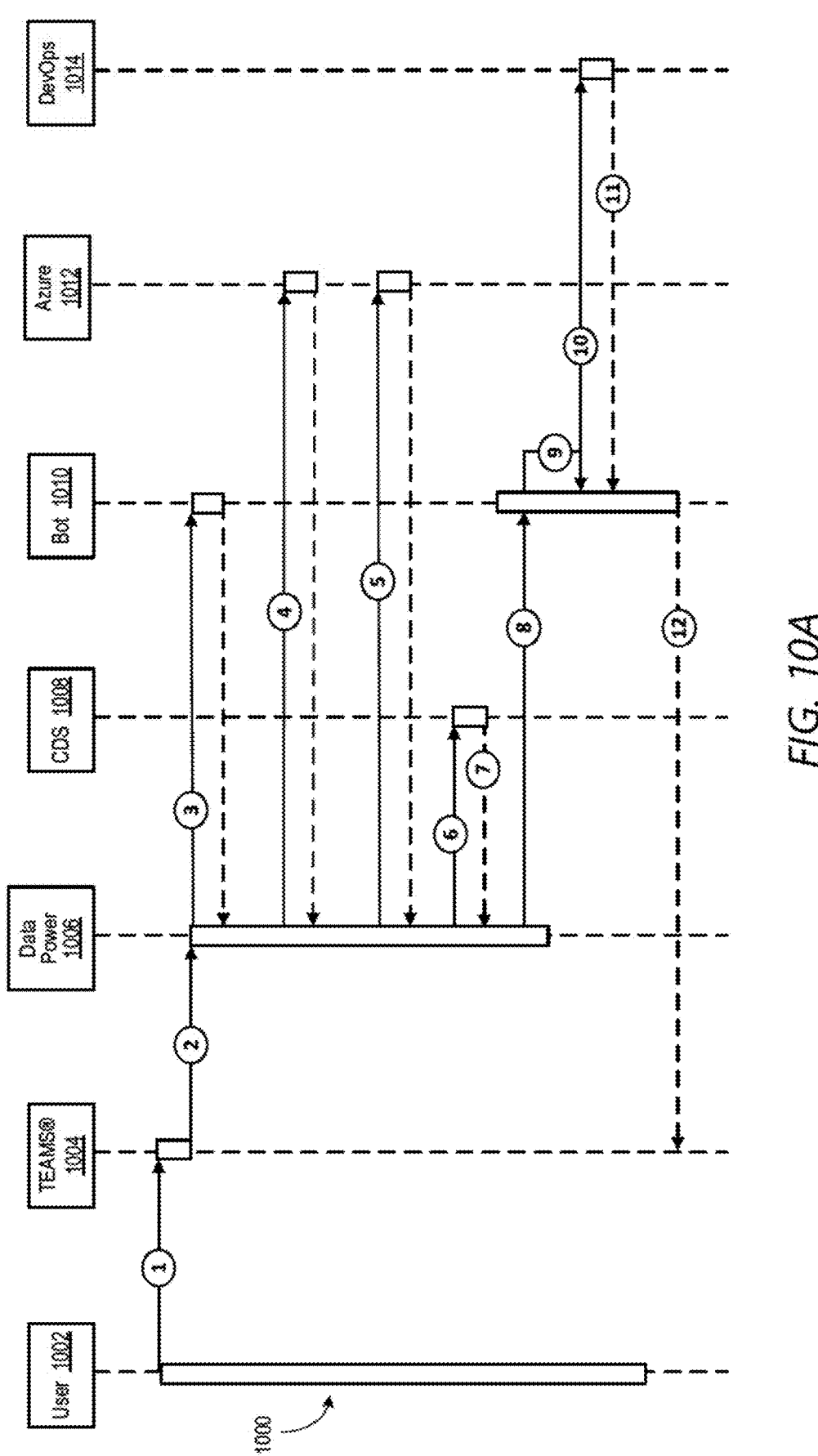
FIGS. 10A and 10B are bi-directional communication sequence diagrams in accordance with some embodiments.
Figure 10B:
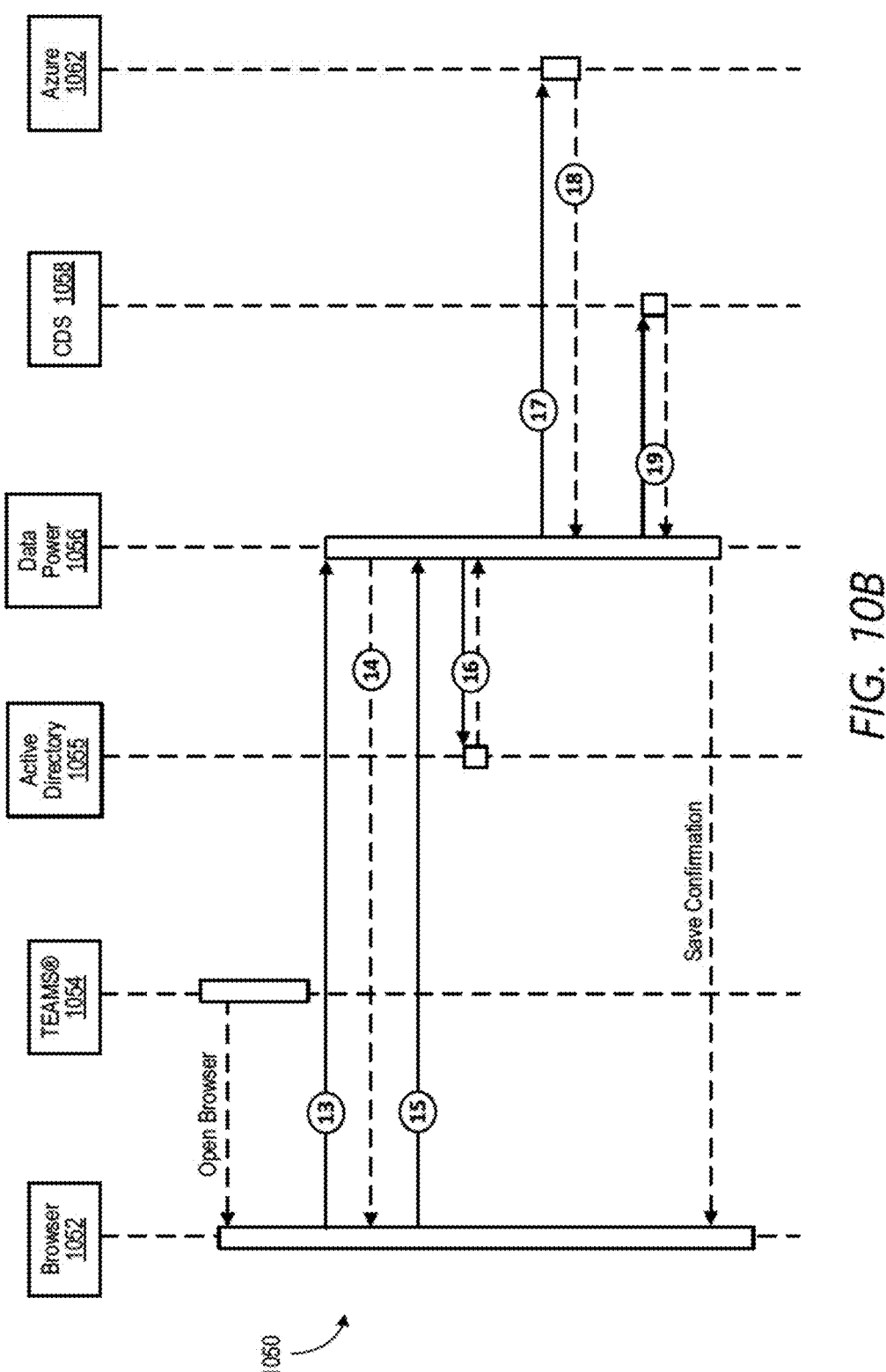

According to some embodiments, active directory authentication and a Personal Access Token ("PAT") are used to achieve pseudo-Single Sign-On ("SSO") functionality (e.g., as described with respect to FIG. 10B). Moreover, in some embodiments, a data-driven orchestrator and a data-driven Application Programming Interface ("API") service layer encapsulate incompatible tool interfaces (e.g., as described with respect to FIG. 6).

In some embodiments, an enterprise may have software development teams that seek to build with speed as well as Information Technology ("IT") operations teams that are focused on mitigating risks. However, when the success of a business depends on the innovation and quality of digital services, it can be too slow and costly for these teams remain disconnected. Improved collaboration between the development and operations teams is at the heart of "DevOps," which can help minimize inefficiencies across an application delivery lifecycle, letting teams be more successful. DevOps best practices can help the team ship better code by improving productivity with automation and cross-functional collaboration. Moreover, the team may create safe releases faster and more predictably while mitigating unplanned work (and making it easier to get ahead of customer experience issues).

In some cases, an enterprise may have thousands of DevOps team members who each access many different integration applications (GitHub, Jenkins, etc.). Each team member may need to log into (and out of) each of these applications multiple times per day to check the status of various software projects. Such an approach can be a time-consuming and costly process in terms of computer resources—especially when a substantial number of team members and/or integration applications are involved. Note that similar problems can occur in connection with enterprise teams other than DevOps teams.

Figure 5:
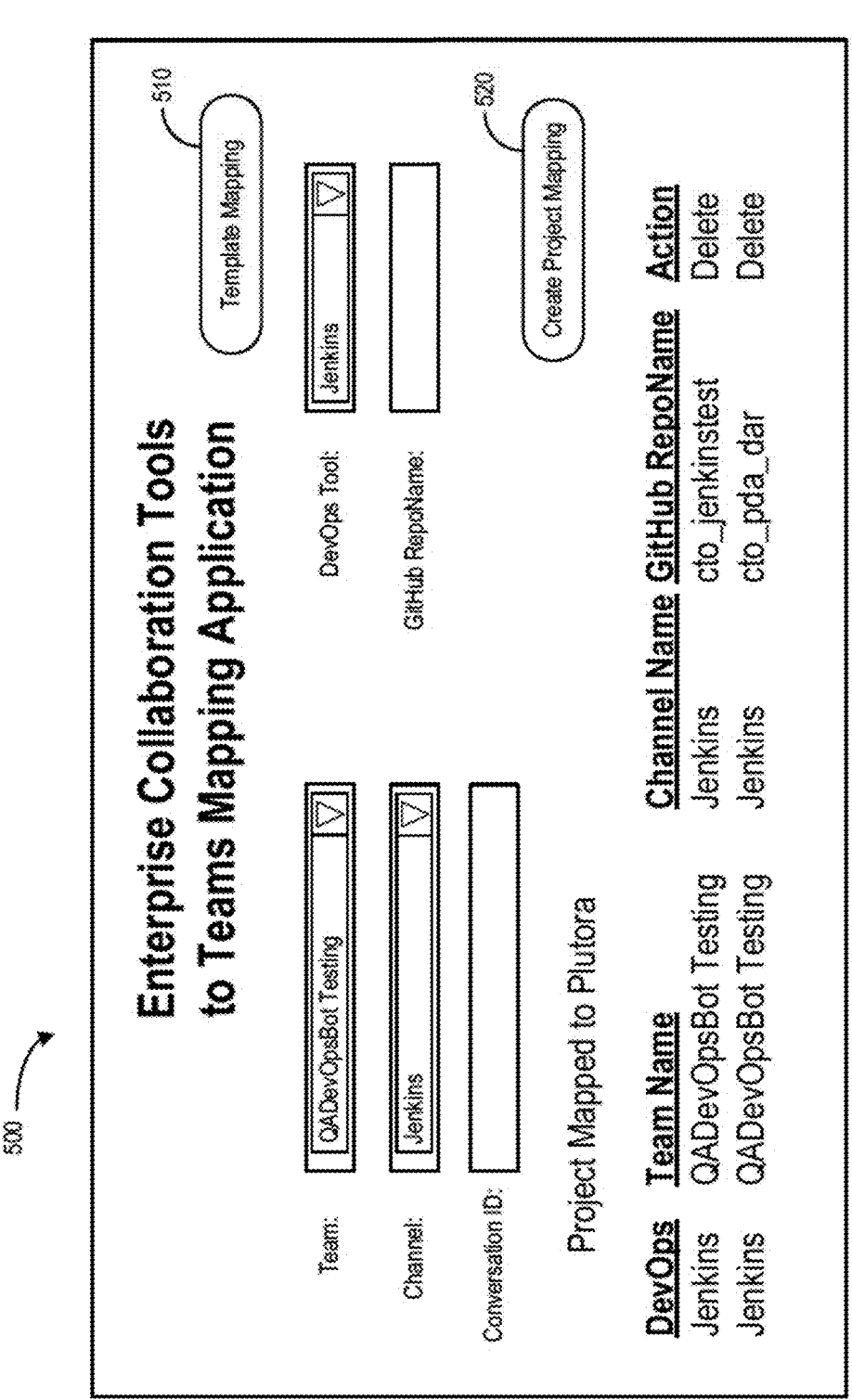
FIG. 5 illustrates an enterprise collaboration mapping application display according to some embodiments.

According to some embodiments, a team owner may provide enterprise collaboration mapping information to configure a collaboration system. For example, FIG. 5 illustrates an enterprise collaboration mapping application display 500 according to some embodiments. The display can be used to provide a team identifier, channel, conversation identifier, DevOps tool name, GitHub RepoName, etc. The display 500 may also be used to provide template mapping 510 (to map a DevOps project with a DevOps event, TEAMS® channel, adaptive card, and/or branch), project mapping 520, deletion of existing mappings, etc.

Figure 6:
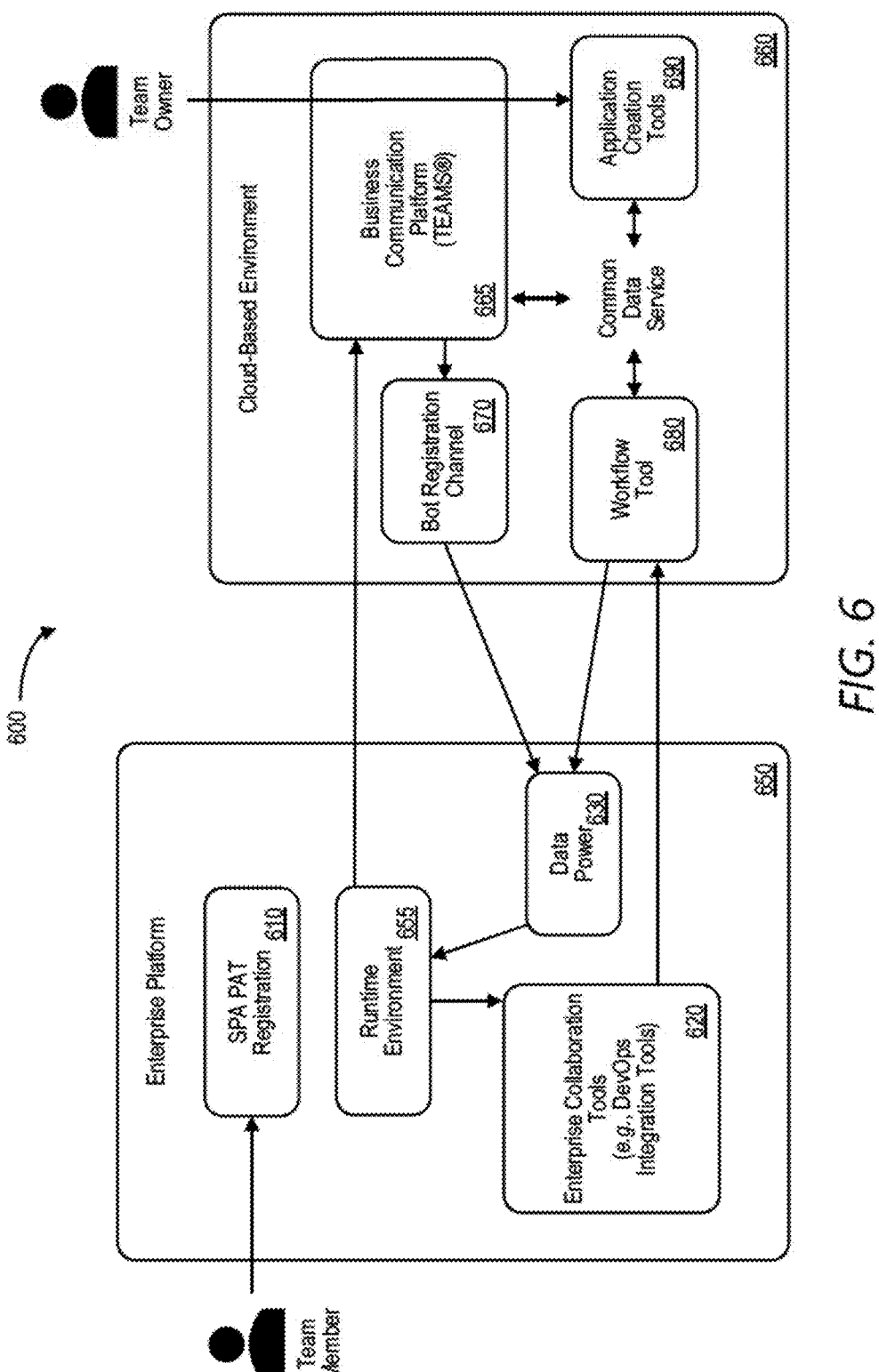
FIG. 6 is a communication architecture diagram in accordance with some embodiments.

FIG. 6 is a communication architecture 600 diagram in accordance with some embodiments. The architecture 600 represents various solution components involved in one-way and bi-directional communication between a business communication platform 665, such as MICROSOFT® TEAMS®, and various DevOps integration tools 620. In particular, an enterprise platform 650 may exchange information with a cloud-based environment 660, such as one associated with the AZURE® and/or MICROSOFT® OFFICE® 365 cloud-based environment. As will be described, the enterprise platform 650 may include a Single Page Application ("SPA") PAT registration element 610, a runtime environment 655 (e.g., associated with a Node.JS bot), the set of DevOps integration tools 620 (e.g., associated with Jenkins, GitHub, urban[code], ServiceNow, etc.), and data power 630 (used to route inbound traffic to on-premise hosted bot services and/or for security functions on the APIs that are being exposed to front-end applications). The cloud-based environment 660 may be associated with the business communication platform 665, a bot registration channel 670, a workflow tool 680 such as MICROSOFT® FLOW®, a Common Data Service ("CDS") such as Dataverse (e.g., storage provided by dynamic 365 to securely hold mapping details, configuration information), and application creation tools 690 such as MICROSOFT® POWER APPLICATIONS®.

The DevOps integration tools 620 may send information to the workflow tool 680 including a data payload and a notification request (secured via an API key). The workflow tool 680 may send information to the data power 630 after receiving an API call from the DevOps integration tools 620 and the workflow tool 680 may perform the following actions:

> read the routing information from the CDS data store, and transform input data to a target card.

The data power 630 may send information to the runtime environment 655 (e.g., Node.JS bot) to pass a call (secured via an application identifier and/or a client secret). The runtime environment 655 may send information to the business communication platform 665 (e.g., TEAMS®) to post the message to the channel (secured via an application identifier and/or client secret). An adaptive card may then send information to the bot registration channel 670 when a user clicks on an adaptive card action button (invoking an API to the bot registration channel 670 secured via a Single-Sign On ("SSO") access function). The bot registration channel 670 may then send information to data power 630 to delegate the call (secured via a JavaScript Object Notation ("JSON") Web Token ("JWT")).

The data power 630 may then work with the runtime environment 655 (e.g., node.JS) to perform the following actions: (i) validate JWT, (ii) get immutable identifier, and (iii) with the immutable identifier get PAT (secured via an application identifier and/or a client secret). The runtime environment 655 may then send information to the DevOps integration tools 620 to use the PAT from data power 630 and call the DevOps integration tools 620 API. A business communication platform 665 (TEAM®) owner (e.g., manager or lead of a project) may then send information to a power application to configure DevOps events to channel routing (secured via SSO and/or an access group). A team member or user (e.g., an employee or contractor using DevOps integration tools 620) may then send information to the SPA PTA registration 610 to register their PAT into CDS.

Note that solutions that do not use common API-based interfaces to support interoperability with current multi-vendor tools may also not support extensibility to any potential future, natively incompatible multi-vendor tool. Some embodiments described herein use a data-driven orchestrator (e.g., MICROSOFT® Power Apps Flow and Dataverse) in conjunction with a data-driven API service layer (DataPower, Node.js Bot, and MICROSOFT® Dataverse) to encapsulate incompatible tool interfaces behind a set of common, custom-defined, abstract interoperable API service interfaces. In the architecture 600 shown in FIG. 6, communication from the business communication platform 665 to the application creation tools 690 may represent, for example, a MICROSOFT® Power Apps Flow and MICROSOFT® Dataverse orchestrating calls to the API service layer. Communications between data power 630, the runtime environment 655, the bot registration channel 670, and the workflow tool 680 represent the API service layer and corresponding data-driven adapter implemented using, for example, IBM DataPower 630, Node.js Bot, and MICROSOFT® Dataverse.

FIG. 7 illustrates one-way communication use case elements 700 for an example of tool utilization according to some embodiments. In S701, DevOps configuration may take into account the fact that a configuration needs to be updated in a DevOps tool to trigger an HTTP post call to a power automate URL with the payload. Note that DevOps is used herein only as an example, and any of the embodiments described herein might be associated with other types of enterprise applications and/or teams. In S702, project mapping may map a project with a corresponding TEAMS® channel using self-service power applications. In S703, template mapping may map an adaptive card template with a corresponding DevOps tool, event, project, branch, and/or TEAMS® channel using self-service power applications. In S704, template management may add adaptive cards templates and map then with a corresponding DevOps tool and/or event. In S705, a DevOps event trigger (e.g., when an event is fired in DevOps tool) may make an HTTP call to a power automate URL with the payload and API key corresponding to the DevOps tool.

In S706, API key validation may (via power automate) validate the call coming from DevOps tool with a respective API key which is stored in the Dataverse and process only valid calls (ignoring invalid calls). In S707, load configuration details may interact (via power automate) with Dataverse and obtain the needed configuration details including AZURE® application identifier, secret, tenant identifier, data power username, password, etc. In S708, load adaptive card template may interact (via power automate) with Dataverse and obtain an adaptive card template that is mapped for the corresponding DevOps tool, event, project, branch, and TEAMS® channel.

In S709, send payload to data power (via power automate) will call data power along with the configuration details in header and template (processed payload in body). In S710, bot execution (via data power) will call bot along with the received headers and body payload. In S711, adaptive card generation will have bot transform the payload and template into an adaptive card using an adaptive card templating Software Development Kit ("SDK"). In S712, generate graph access token will have the bot generate na access token for graph API from AZURE® active directory to access TEAMS®. In S713, post message to TEAMS® will have the bot post the adaptive card DevOps notification into specified TEAMS® channel using the graph API. In S714, error logging into TEAMS® channel (via power automate) will log the errors (if any occurred during execution) into specified TEAMS® channel. In S715, navigation to DevOps tool (with browser) will let user navigate to corresponding DevOps tool project using the options that are available in the posted notification adaptive card in TEAMS® with SSO enabled in the browser.

Figure 8:
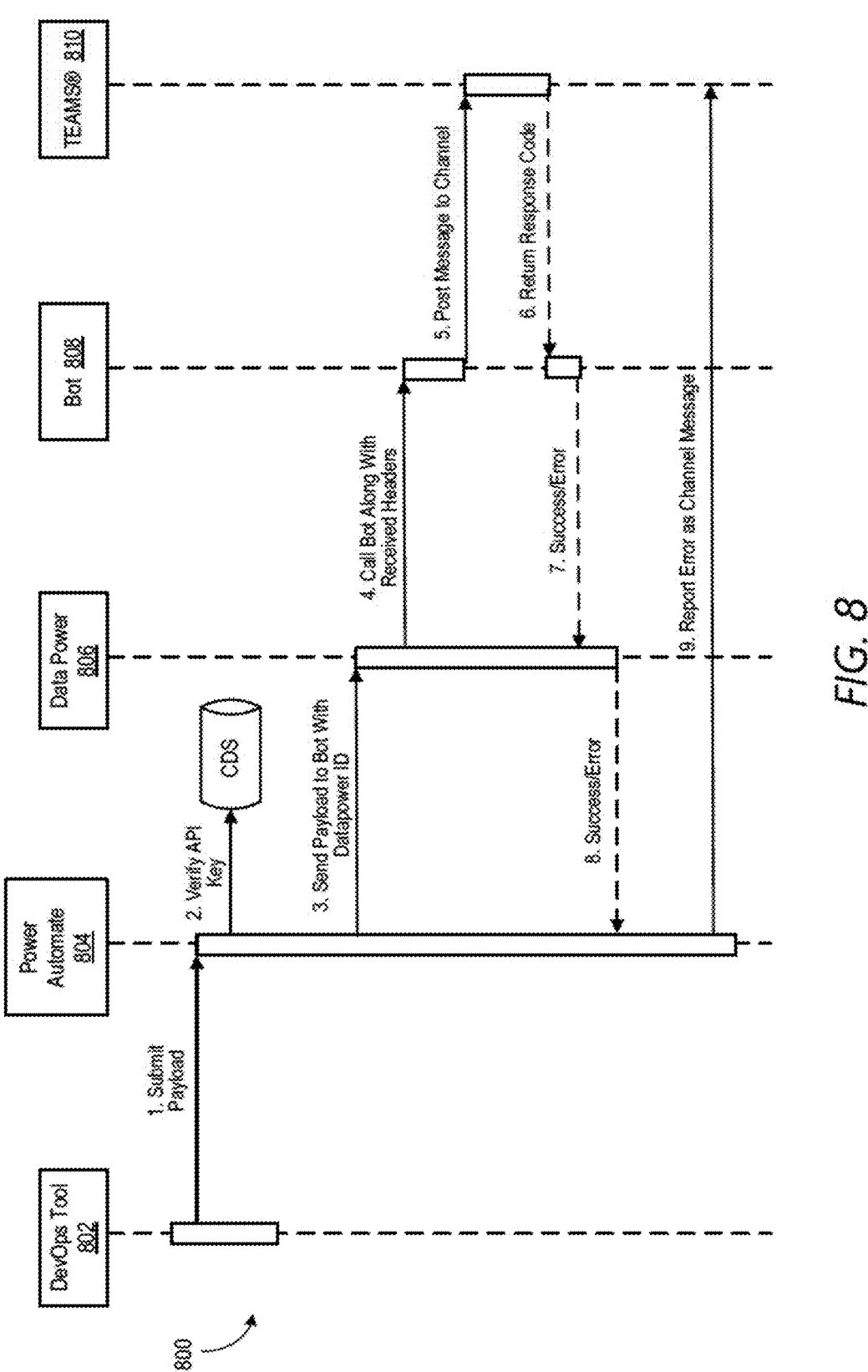
FIG. 8 is a one-way communication sequence diagram in accordance with some embodiments.

FIG. 8 is a one-way communication sequence diagram 800 in accordance with some embodiments. At (1), a DevOps tool 802 submits a payload to power automate 804. At (2), power automate 804 verifies an API key using CDS and sends the payload to a bot 808 with a data power 806 identifier at (3) and (4) (data power 806 calls the bot 808 along with received headers). At (5), the bot 808 posts a message to the appropriate channel via TEAMS® 810. TEAMS® 810 returns a response code to the bot 808 at (6). The bot 808 may then report success or error to power automate 804 via data power 806 at (7) and (8). Power automate 804 may then report any error to TEAMS® 810 as a channel message at (9).

In addition to one-way communications, some embodiments allow a team member to respond to an adaptive information card. For example, FIG. 9 illustrates bi-directional communication use case elements 900 according to some embodiments. In S901, action on adaptive card detects when a user clicks on an adaptive card option. In particular, data power will be called with a payload and TEAMS® generated access token. In S902, validate JWT uses data power to validate the JWT using a service provided by the bot application. In S903, generate access token for graph API uses data power to generate an access token from an AZURE® active directory for the graph API with a data power client identifier and secret. In S904, get user immutable identifier uses data power to get the user immutable identifier from the AZURE® Active Directory Identifier ("AADID") in the payload using graph API with the obtained access token.

In S905, generate access token for Dataverse uses data power to generate an access token from the AZURE® active directory for dynamics 365. In S906, retrieve PAT from Dataverse uses data power to retrieve the user's PAT (with the user immutable identifier) and platform from Dataverse with the obtained access token. In S907, forward request to uses data power to forward the request to the bot along with obtained details from Dataverse. In S908, bot processing will verify the PAT details and call the corresponding DevOps tool with the PAT and other needed details. At this point, a response/error may be posted back into corresponding TEAMS® channel.

During but processing if PAT is not available for the user in S909, then the bot will post an adaptive card to the corresponding user with an option to register the PAT. In S910, PAT registration will let the user navigate to the PAT registration page (using an option in the posted adaptive card) and submit PAT details. In S911, on PAT submission PAT details will be posted to data power which will store the PAT details into Dataverse after validating the call using Kerberos. In S912, during bot processing if the call to the DevOps tool using PAT fails, then the bot will post an adaptive card to corresponding user with option to update the PAT. In S913, the user may navigate to the PAT registration page using an option in the posted adaptive card and update the PAT details. In S914, on PAT submission the PAT details will be posted to data power which will update the PAT details stored in Dataverse after validating the call using Kerberos.

FIG. 10A is a bi-directional communication sequence diagram 1000 in accordance with some embodiments. At (1), a user 1002 clicks on a notification adaptive card button which is sent to TEAMS® 1004. TEAMS® calls a bot 1010 by sending the application JWT to data power 1006 at (2). At (3), data power 1006 validates the JWT reads the AZURE® active directory object and platform values to the bot 1010. At (4), data power 1006 gets the access token with client secret to the AZURE active directory token service 1012. At (5), data power 1006 gets the user immutable identifier with the AZURE® active directory object identifier. At (6), data power 1006 queries PAT for the platform and user immutable identifier to the CDS 1008. At (7), data power 1006 gets PAT for the user and record ID from the CDS 1008. At (8), data power 1006 forwards the request to the bot 1010 with the user properties, client identifier, and secret. The bot 1010 checks for a null condition at (9) and makes a submission to the DevOps 1014 API at (10). At (11), a success code is sent from DevOps 1014 to the bot 1010. At (12), the bot 1010 updates the notification card in TEAMS® 1004.

FIG. 10B is another bi-directional communication sequence diagram 1050, associated with a PAT save request, in accordance with some embodiments. The diagram 1050 may, for example, represent actions taken by the system after a web browser 1052 is opened (e.g., by TEAMS® 1054) with an HTML URL and requests a web page via a SPA. At (13), the browser 1052 submits a PAT to a data power 1056 end point. A data power challenge is then sent from data power 1056 back to the browser 1052 at (14). The browser 1052 may then respond to the challenge at (15). At (16), data power 1056 gets an immutable ID from an active directory 1055. At (17) and (18), data power 1056 gets an access token with a client secret from Azure 1062 (e.g., an active directory token service). At (19), data power 1062 saves the PAT with the immutable ID via CDS 1058 and a confirmation is saved via data power 1056 and the web browser 1052. In this way, data power 1056 may determine if there is an existing PAT for a requesting user (and re-direct the user to register a new PAT registration application if no existing PAT is found).

Note that in some cases webhook technology may not provide adequate secure access control. For example, the use of webhooks might not be compatible with an existing security solution (e.g., based on customized Security Assertion Markup Language ("SAML") federation that enforces user access to tools and/or projects according to a "least privilege" protocol). Thus, embodiments described herein may use active directory 1065 authentication and PATs to achieve pseudo-SSO in a way that is compatible an existing in-house solution as shown in FIG. 10B. This compatibility may let the system enforce user access according to an existing "least privilege" protocol.

Figure 11:
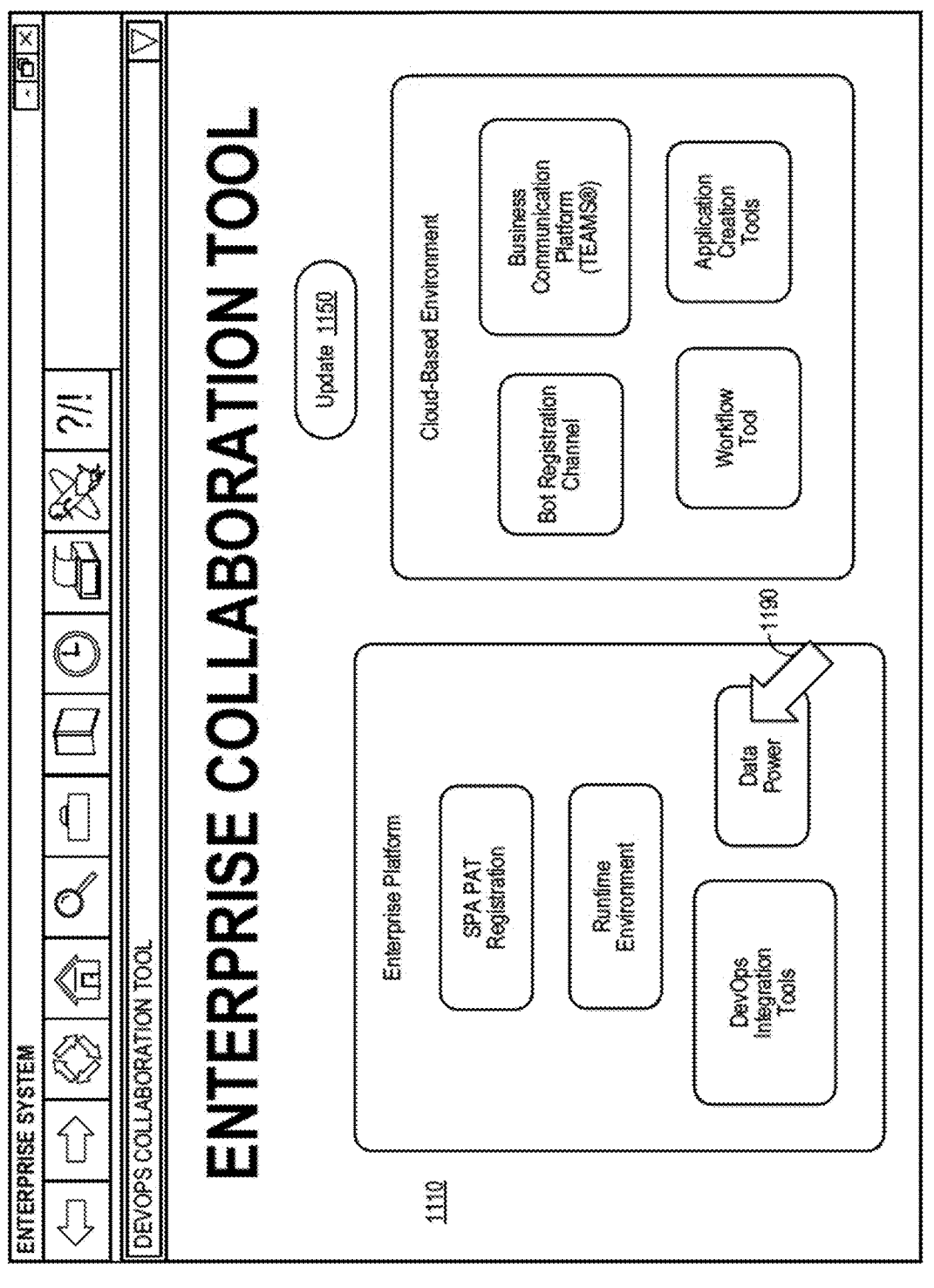
FIG. 11 is a collaboration system display according to some embodiments.

The configuration of a collaboration system may be presented on a Graphical User Interface ("GUI"). For example, FIG. 11 is a collaboration system display 1100 including graphical representations of elements of a collaboration system 1110 in accordance with any of the embodiments described herein. Moreover, selection of an element, such as an enterprise platform or a cloud-based environment (e.g., via touchscreen or computer mouse pointer 1190) may display configuration information about that element and/or let an operator or administrator adjust the configuration (e.g., to modify an adaptive information card layout). The display 1100 may further let the operator or administrator select an "Update" icon 1150 to cause the system or platform to save changes, apply reconfigurations, etc.

Figure 12:
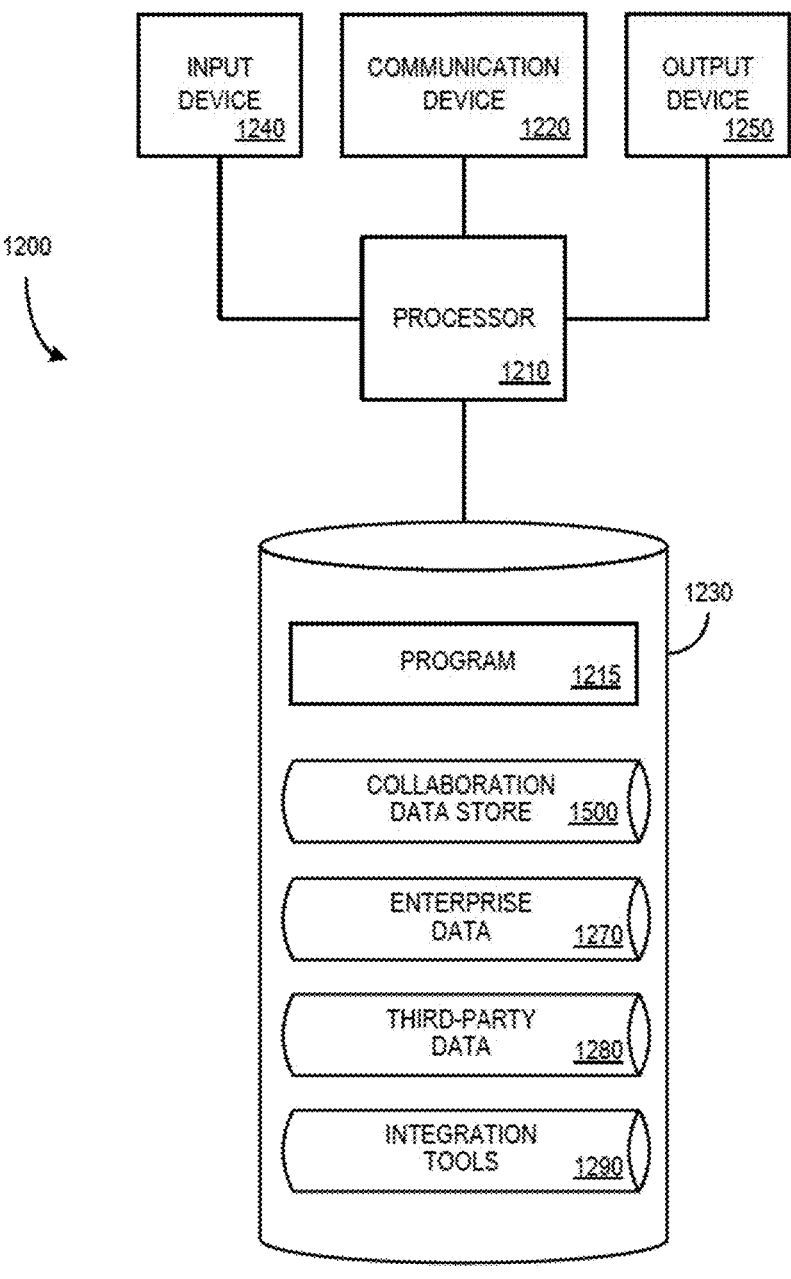
FIG. 12 is a block diagram of an apparatus in accordance with some embodiments of the present invention.

The embodiments described herein may be implemented using any number of different hardware configurations. For example, FIG. 12 illustrates an apparatus 1200 that may be, for example, associated with the systems and architectures 100, 600 described with respect to FIGS. 1 and 6, respectively. The apparatus 1200 comprises a processor 1210, such as one or more commercially available Central Processing Units ("CPUs") in the form of one-chip microprocessors, coupled to a communication device 1220 configured to communicate via a communication network (not shown in FIG. 12). The communication device 1220 may be used to communicate, for example, with one or more remote cloud-based environments, administrator computers, and/or communication devices (e.g., PCs and smartphones). Note that communications exchanged via the communication device 1220 may utilize security features, such as those between a public internet team member and an internal network of an insurance company and/or an enterprise. The security features might be associated with, for example, web servers, firewalls, and/or PCI infrastructure. The apparatus 1200 further includes an input device 1240 (e.g., a mouse and/or keyboard to enter information about data sources, mappings, third-parties, etc.) and an output device 1250 (e.g., to output reports regarding collaborations, recommended changes, alerts, etc.).

The processor 1210 also communicates with a storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 stores a program 1215 and/or collaboration system or application for controlling the processor 1210. The processor 1210 performs instructions of the program 1215, and thereby operates in accordance with any of the embodiments described herein. For example, the processor 1210 may transmit, from a set of integration tools 1290 to a workflow tool of a remote cloud-based environment, a data payload including a notification request associated with a channel. The processor 1210 may also transmit, from a runtime environment to a business communication platform of the cloud-based environment, a request to post a notification to the channel and arrange for a member of aa selected enterprise team to receive an adaptive information card, pushed by the business communication platform via the channel, containing information associated with at an integration tool 1290.

The program 1215 may be stored in a compressed, uncompiled and/or encrypted format. The program 1215 may furthermore include other program elements, such as an operating system, a database management system, and/or device drivers used by the processor 1210 to interface with peripheral devices.

As used herein, information may be "received" by or "transmitted" to, for example: (i) the apparatus 1200 from another device; or (ii) a software application or module within the apparatus 1200 from another software application, module, or any other source.

In some embodiments (such as shown in FIG. 12), the storage device 1230 further stores collaboration data store 1300 (e.g., defining teams and/or team members), enterprise data 1270 (e.g., associated with a business such as an insurance company), third-party data 1280 (e.g., associated with an integration tool or business communication platform), and the integration tools 1290 (e.g., GitHub, Jenkins, etc.). An example of database that might be used in connection with the apparatus 1200 will now be described in detail with respect to FIG. 13. Note that the database described herein is only an example, and additional and/or different information may be stored therein. Moreover, various databases might be split or combined in accordance with any of the embodiments described herein. For example, the integration tools 1290 and collaboration data store 1300 might be combined and/or linked to each other within the program 1215.

Referring to FIG. 13, a table is shown that represents the collaboration data store 1300 that may be stored at the apparatus 1200 according to some embodiments. The table may include, for example, entries associated with integration teams or team members. The table may also define fields 1302, 1304, 1306, 1308, 1310 for each of the entries. The fields 1302, 1304, 1306, 1308, 1310 may, according to some embodiments, specify: a member identifier 1302, a member name 1304, collaboration enterprise tools 1306, a communication address 1308, and other collaboration parameters 1310. The collaboration data store 1300 may be created and updated, for example, based on information electrically received from various data sources (e.g., including when new members are added or deleted, teams are adjusted, integration tools are updated, etc.) that may be associated with an insurer or other enterprise.

The member identifier 1302 and member name 1304 may be, for example, alphanumeric codes that identify a particular employee or contractor who uses DevOps tools. The collaboration enterprise tool 1306 might indicate which integration team the member works for, and the communication address 1308 might comprise any information may be used to send data to the member. According to some embodiments, the collaboration data store 1300 may further contain other collaboration parameters (e.g., various notification subscriptions, comments, reviews, etc.).

Thus, embodiments may provide an automated and efficient way to help minimize inefficiencies across an application delivery lifecycle, letting teams be more successful. DevOps best practices can help the team ship better code by improving productivity with automation and cross-functional collaboration. Moreover, the team may create safe releases faster and more predictably while mitigating unplanned work (and making it easier to get ahead of customer experience issues). In addition, the bi-directional communication feature will make collaboration within the enterprise easier, improving productivity and speeding up the collaborative process. Moreover, embodiments may let the system meet security, interoperability, and/or extensibility requirements as needed. Embodiments may incorporate an original security design and an original API integration design as components of an original overall solution.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to specific types of enterprises, embodiments may instead be associated with other types of enterprises in additional to and/or instead of those described herein (e.g., banks or other financial institutions). Similarly, although certain types of teams and parameters were described in connection some embodiments herein, any other types of teams (e.g., human resources, sales teams, engineers, insurance claim handlers, underwriters, telephone call center customer service representatives, etc.) and parameters might be used instead. Moreover, embodiments may be implemented using business communication platforms other than TEAMS® (e.g., SALESFORCE.COM® or SLACK®). That is, embodiments described herein may be used by any type of team or team member to collaborate via enterprise tools and any type of business communication platform.

Figure 14:
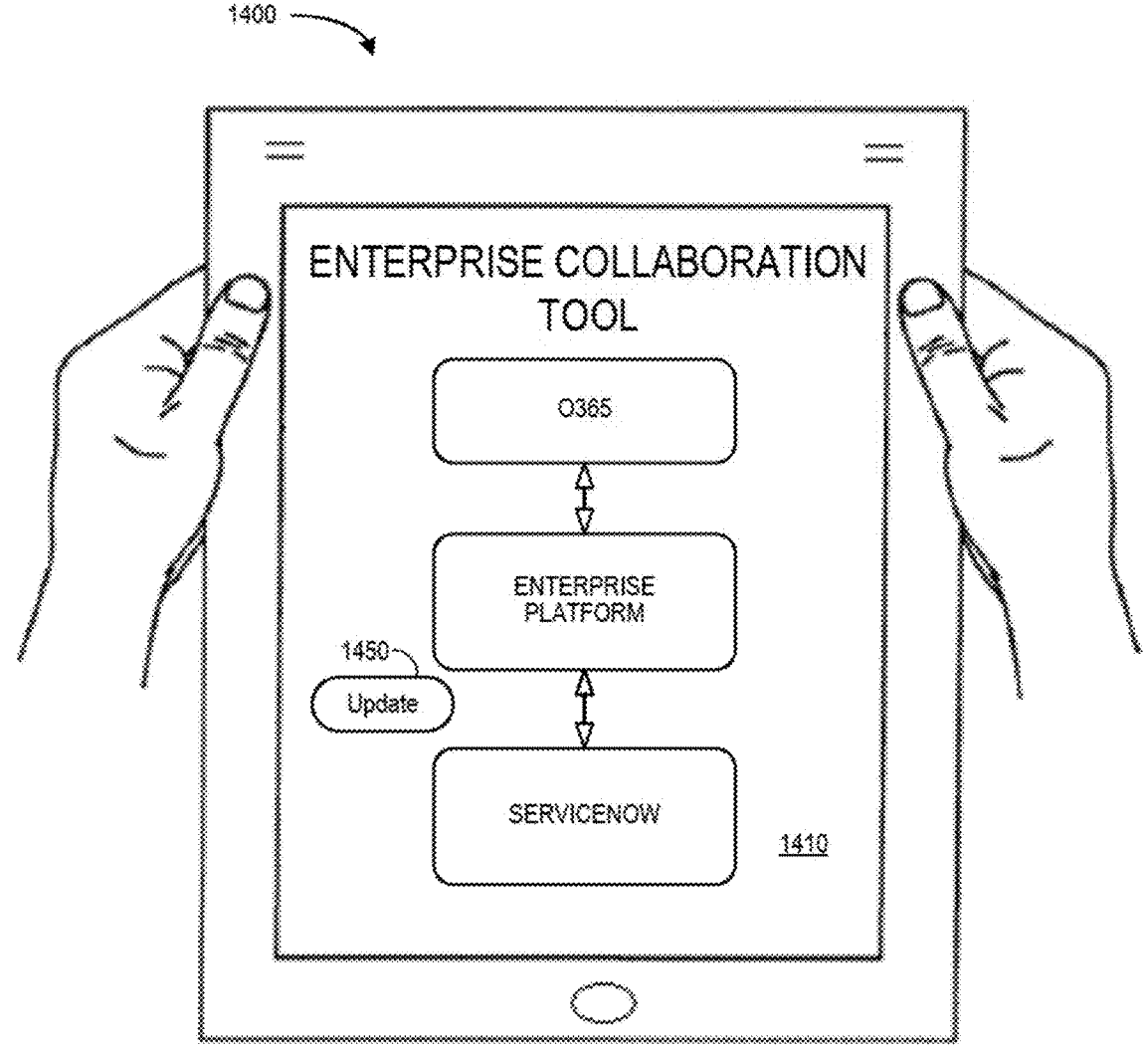
FIG. 14 illustrates a tablet computer with a collaboration system display according to some embodiments.

Note that the displays and devices illustrated herein are only provided as examples, and embodiments may be associated with any other types of team member interfaces. For example, FIG. 14 illustrates a handheld tablet computer 1400 with a collaboration system display 1410 according to some embodiments. The collaboration system display 1410 shows elements of a ServiceNow architecture that might include selectable data that can be modified by a team member of the tablet computer 1400 (e.g., via an "Update" icon 1450) to view updated collaboration system data associated with an enterprise (e.g., including, in some embodiments, available templates and mapping information).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system associated with an enterprise, comprising:

(a) a collaboration data store that contains electronic records associated with a set of enterprise teams, each electronic record including an electronic record identifier and at least one team member communication address;

(b) an enterprise platform, coupled to the collaboration data store, including:

a computer processor, and a computer memory, coupled to the computer processor, storing instructions that, when executed by the computer processor cause the enterprise platform to:

(i) retrieve, from the collaboration data store, information about a selected enterprise team, (ii) transmit, from a set of integration tools to a workflow tool of a remote cloud-based environment, a data payload including a notification request associated with a channel, (iii) transmit, from a runtime environment to a business communication platform of the remote cloud-based environment, a request to post a notification to the channel, and (iv) arrange for a member of the selected enterprise team to receive an adaptive information card, pushed by the business communication platform via the channel, containing information associated with at least one of the integration tools, wherein the member who receives the adaptive information card responds to the business communication platform via bi-directional communication, wherein active directory authentication and a Personal Access Token ("PAT") are used to achieve Single Sign-On ("SSO") functionality, and wherein a data-driven orchestrator and a data-driven Application Programming Interface ("API") service layer encapsulate incompatible tool interfaces; and (c) a communication port, coupled to the enterprise platform, that transmits data to remote team member devices, including information about the adaptive information card, via a distributed communication network.

2. The system of claim 1, wherein the selected enterprise team is associated with at least one of: (i) a software development enterprise team, and (ii) an information technology operations enterprise team.

3. The system of claim 1, wherein the bi-directional communication sends information to at least one of the set of integration tools.

4. The system of claim 1, wherein a team member provides, to a single page application PAT registration element, information associated with a common data service and user access according to a "least privilege" policy is enforced.

5. The system of claim 1, wherein a team owner provides, to the business communication platform, configuration information mapping events to channel routing.

6. The system of claim 1, wherein the enterprise platform further includes a data power component for security functions on APIs exposed to front end applications.

7. The system of claim 1, wherein the adaptive information card includes information associated with at least one of: (i) data quality statistics, (ii) comments, (iii) an execution report, (iv) a test execution, (v) a team, (vi) an iteration, (vii) an action, (viii) an issue, and (ix) an author.

8. The system of claim 1, wherein security is provided via at least one of: (i) an API key, (ii) the PAT, (iii) a service account, (iv) an application identifier, (v) a client secret, (vi) a SSO access function, and (vii) a JavaScript Object Notation ("JSON") Web Token ("JWT").

9. A computerized method associated with an enterprise, comprising:

retrieving, by a computer processor of an enterprise platform from a collaboration data store, information about a selected enterprise team, wherein the collaboration data store contains electronic records associated with a set of enterprise teams, each electronic record including an electronic record identifier and at least one team member communication address;

transmitting, from a set of integration tools to a workflow tool of a remote cloud-based environment, a data payload including a notification request associated with a channel;

transmitting, from a runtime environment to a business communication platform of the remote cloud-based environment, a request to post a notification to the channel;

arranging for a member of the selected enterprise team to receive an adaptive information card, pushed by the business communication platform via the channel, containing information associated with at least one of the integration tools; and receiving, from the member who receives the adaptive information card, a response to the business communication platform via bi-directional communication, wherein a communication port coupled to the enterprise platform transmits data to remote team member devices, including information about the adaptive information card, via a distributed communication network, wherein active directory authentication and a Personal Access Token ("PAT") are used to achieve Single Sign-On ("SSO") functionality, and wherein a data-driven orchestrator and a data-driven Application Programming Interface ("API") service layer encapsulate incompatible tool interfaces.

10. The method of claim 9, wherein the selected enterprise team is associated with at least one of: (i) a software development enterprise team, and (ii) an information technology operations enterprise team.

11. The method of claim 9, wherein the bi-directional communication sends information to at least one of the set of integration tools.

12. The method of claim 9, wherein a team member provides, to a single page application PAT registration element, information associated with a common data service and user access according to a "least privilege" policy is enforced.

13. The method of claim 9, wherein a team owner provides, to the business communication platform, configuration information mapping events to channel routing.

14. The method of claim 9, wherein the enterprise platform further includes a data power component for security functions on APIs exposed to front end applications.

15. The method of claim 9, wherein the adaptive information card includes information associated with at least one of: (i) data quality statistics, (ii) comments, (iii) an execution report, (iv) a test execution, (v) a team, (vi) an iteration, (vii) an action, (viii) an issue, and (ix) an author.

16. The method of claim 9, wherein security is provided via at least one of: (i) an API key, (ii) the PAT, (iii) a service account, (iv) an application identifier, (v) a client secret, (vi) a SSO access function, and (vii) a JavaScript Object Notation ("JSON") Web Token ("JWT").

17. A non-transitory, computer-readable medium storing instructions, that, when executed by a processor, cause the processor to perform a collaboration method associated with an enterprise, the method comprising:

retrieving, by a computer processor of an enterprise platform from a collaboration data store, information about a selected enterprise team, wherein the collaboration data store contains electronic records associated with a set of enterprise teams, each electronic record including an electronic record identifier and at least one team member communication address;

transmitting, from a set of integration tools to a workflow tool of a remote cloud-based environment, a data payload including a notification request associated with a channel;

transmitting, from a runtime environment to a business communication platform of the remote cloud-based environment, a request to post a notification to the channel;

arranging for a member of the selected enterprise team to receive an adaptive information card, pushed by the business communication platform via the channel, containing information associated with at least one of the integration tools; and receiving, from the member who receives the adaptive information card, a response to the business communication platform via bi-directional communication, wherein a communication port coupled to the enterprise platform transmits data to remote team member devices, including information about the adaptive information card, via a distributed communication network, wherein active directory authentication and a Personal Access Token ("PAT") are used to achieve Single Sign-On ("SSO") functionality, and wherein a data-driven orchestrator and a data-driven Application Programming Interface ("API") service layer encapsulate incompatible tool interfaces.

18. The medium of claim 17, wherein the selected enterprise team is associated with at least one of: (i) a software development enterprise team, and (ii) an information technology operations enterprise team.

19. The medium of claim 17, wherein the bi-directional communication sends information to at least one of the set of integration tools.

20. The medium of claim 17, wherein a team member provides, to a single page application PAT registration element, information associated with a common data service and user access according to a "least privilege" policy is enforced.

* * * * *